Nov. 8, 1949  J. R. CHAPIN  2,487,311
IRRIGATION PIPE COUPLER
Filed June 9, 1947  2 Sheets-Sheet 1
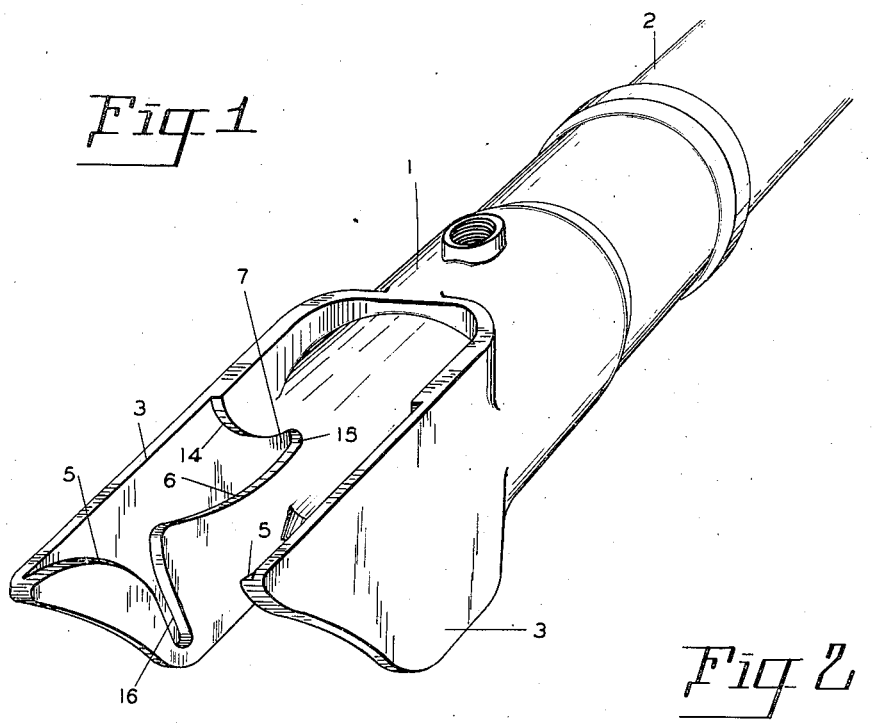
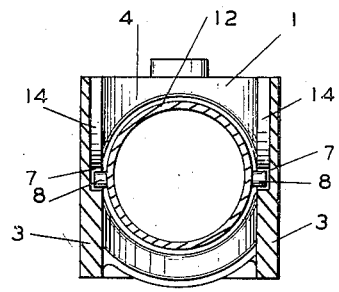
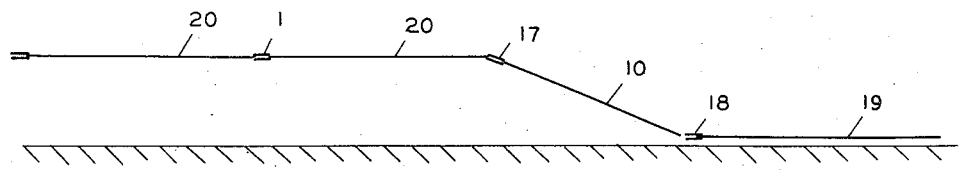
INVENTOR
JACK R. CHAPIN
ATTORNEY Nov. 8, 1949 J. R. CHAPIN 2,487,311
IRRIGATION PIPE COUPLER
Filed June 9, 1947 2 Sheets-Sheet 2
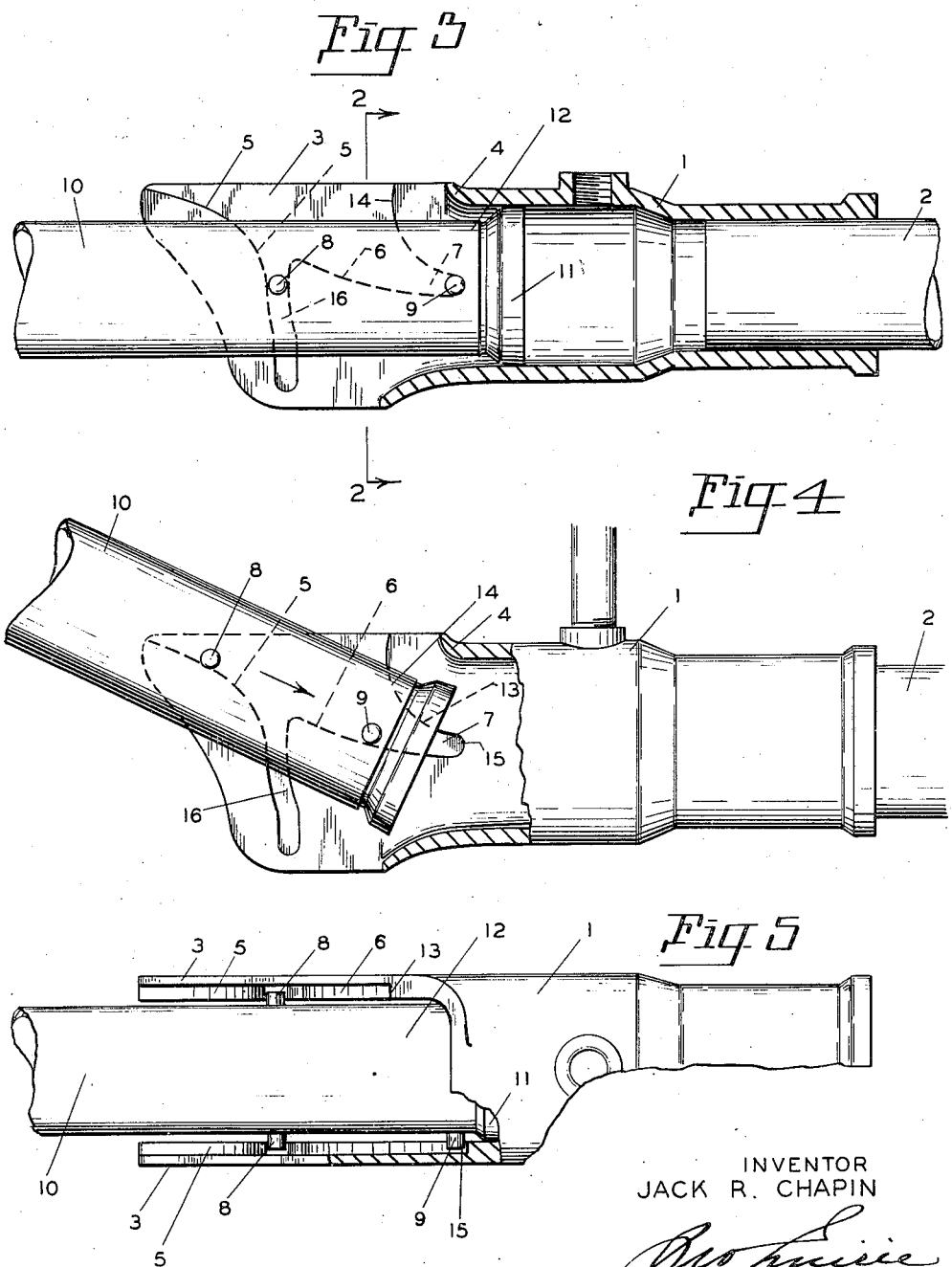
INVENTOR
JACK R. CHAPIN
ATTORNEY Patented Nov. 8, 1949

2,487,311

UNITED STATES PATENT OFFICE 2,487,311

IRRIGATION PIPE COUPLER

Jack R. Chapin, Salem, Oreg.

Application June 9, 1947, Serial No. 753,517

2 Claims. (Cl. 285—143)

This invention relates to pipe couplers for irrigation piping and the primary object of the invention is to provide a coupler wherein the pipe can be inserted on an incline and brought down to a horizontal line or beyond, the said pipe being automatically forced into the coupler by the locking means.

This locking means consists of cams formed in the coupler adapted to receive outwardly extending pins associated with the end of the pipe. These cams are so shaped so as to pull the pipe into the coupler when the pipe is lowered to its normal pipe line position, either horizontal or slightly at an angle to the horizontal.

A further object of the invention is to provide an entrance to the coupler that will guide the pipe to be inserted therein into its normal coupled position with the least amount of effort from the operator making the pipe connection.

These and other incidental objects will be apparent in the drawings, specification and claims.

Referring to the drawings:

Figure 1 is a perspective view of my new and improved coupler for irrigation pipes.

Figure 2 is an end sectional view taken on line 2—2 of Figure 3 looking in the direction indicated.

Figure 2A is a diagrammatical illustration of connecting a series of pipes already connected together to the main line.

Figure 3 is a side sectional view of the coupler showing the pipe in coupled position.

Figure 4 is a side view of Figure 3 indicating the pipe being inserted into the coupler, parts broken away for convenience of illustration.

Figure 5 is a plan view of the coupling, the pipe being in locked or inserted position.

In the drawings:

My new and improved coupler consists of the tubular body element 1, which is connected to the pipe 2 in any well known manner. My invention consists in extending side plates 3 beyond the pipe receiving end 4 of the coupler. Formed on the inner sides of the plates 3 are cam surfaces 5, 6 and slots 7 for receiving the outwardly extending pins 8 and 9 forming part of the pipe 10. The usual flexible seal 11 is associated with the end 12 of the pipe.

I will now describe the method of coupling the pipe together with my new and improved coupler. The outer end of the pipe 10 is raised, the outwardly extending pins 8 and 9 are lowered to a position resting on the cam surfaces 5 and 6, the pipe is then pushed towards the coupler so that the pin 9 begins to enter the slot 7. When the pin 9 reaches the point 13 of the cam surface 14 the outer end of the pipe 10 is brought down or lowered, causing the pin 9 to ride downwardly on the cam surface 5, and as this surface is curved as illustrated, it forces the pins 8 in the direction of the arrow including the pipe until the pin reaches the end 15 of the slot 7, and the pin 8 falls down into the slot 16 as illustrated in Figure 3.

The pins 9 after entering the slot 7 prevent the pipe 10 from rotating relative to the main line pipe 2 and the coupling. In other words maintaining the risers, not here shown, in vertical positions. The pin 8 will hold the pipe in coupled position or in the position shown in Figure 3 within the coupler by contacting the cam surface 5, which is on a radius with the end 15 of the slot 7. The action of the pins 8 riding down on the curved cam surface 5 automatically, as stated above, forces the end of the pipe into its final position as illustrated in Figure 3 without the operator having to exert any end movement of the pipe 10.

This is most important as these pipes are not too easily handled, especially when trying to force one within the other endwise at an angle to one another, as for instance when they are bridging a valley in the ground surface. When the pipe is at the angle shown in Figure 4 the down movement gives a positive forcing action to the pipe into the coupler due to the cam action of the pins 8 against the cam 5 providing a considerable force to the movement of the pipe when the outer end of the pipe is forcibly lowered. The position of the end 15 of the slot 7 is such that the sealing gasket 11 easily takes its position as shown in Figure 3 and will seal at any angle to the horizontal line due to the position of the pins 9 within the slot 7.

The slot 16 is extended sufficiently down on the side plates 3 to permit the pins 8 to allow the pipe to drop to a sufficient angle to be handled when several lengths of pipe are already coupled together and are about to be coupled to the main line, as illustrated in the diagrammatical drawing in Figure 2A. This allows the pipe 10 adjacent the coupling 18 to be raised a sufficient angle to allow for the coupling of the series of pipes 20 being handled. In Figure 2A the coupling 17 illustrates the operation of the pins 8 dropping down to the bottom of the slot 16, while the coupling 1 illustrates the one being made connecting the main line 19 to the series of coupled or pipes 20 being carried by workmen not shown in the drawings.

I do not wish to be limited to the exact mechanical structure as shown, as other modified forms may be substituted still coming within the scope of my invention.

What I claim is:

1. A pipe coupling, comprising in combination, a pipe coupler including a body portion having a sleeve, a pair of spaced apart parallel wings extending axially of said body portion, curved cam surfaces formed on the inner sides of said wings, said cam surfaces inclining at an angle with reference to the axis of the sleeve and merging into a pair of seats, said wings having other cam surfaces substantially vertically disposed with reference to the axis of the sleeve and merging into and forming a continuation of the inclined cam surfaces, a pipe, a pair of lugs extending diametrically from the sides of the pipe adjacent the forward end thereof to preliminarily direct the pipe to the open end of the sleeve when coupling, a second pair of diametrically disposed lugs on opposite sides of the pipe spaced from the first-mentioned pair of lugs equal to the distance between the seats and the substantially vertically disposed cam surfaces, whereby when the end of the pipe is tilted on the lugs in the seats, the second-mentioned pair of lugs following the substantially vertical cams will force the pipe into contact with and in alignment with the sleeve.

2. A pipe coupling, comprising a body portion formed with an opening and a pair of wings extending axially of said opening and in parallel relationship from opposite sides of the said body portion, a cam groove on the inner side of each wing, said cam grooves being opened at their outer ends and closed at their inner ends to form seats, and said cams being curved and at an incline and generally longitudinal of the axis of the body portion, a pipe having diametrically disposed pins engaging in the cam grooves to align said pipe with the opening and prevent rotation of said pipe when the pins are in the seats.

JACK R. CHAPIN.

REFERENCES CITED

The following references are of record in the file of this patent:

UNITED STATES PATENTS

| Number | Name | Date |
| --- | --- | --- |
| 1,647,324 | Waggoner | Nov. 1, 1927 |
| 1,994,007 | Tallant | Mar. 12, 1935 |